Figure 1:
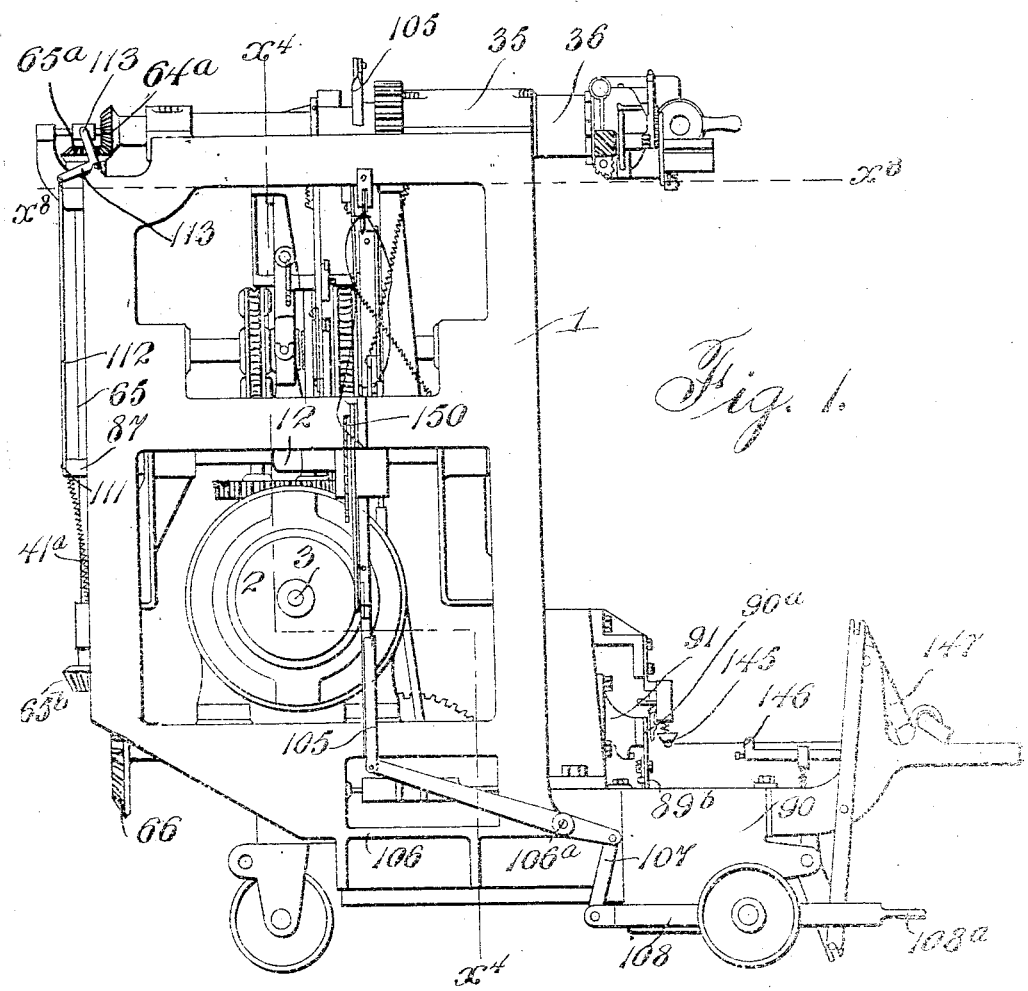

O. A. HANFORD.
GATHER ACTUATED CONTROLLER FOR GLASS BLOWING MACHINES.
APPLICATION FILED JAN. 6, 1911. RENEWED DEC. 30, 1912.

1,123,525.

Patented Jan. 5, 1915.
7 SHEETS—SHEET 1.

O. A. HANFORD.
GATHER ACTUATED CONTROLLER FOR GLASS BLOWING MACHINES.
APPLICATION FILED JAN. 6, 1911. RENEWED DEC. 30, 1912.

1,123,525.

Patented Jan. 5, 1915.
7 SHEETS—SHEET 3.

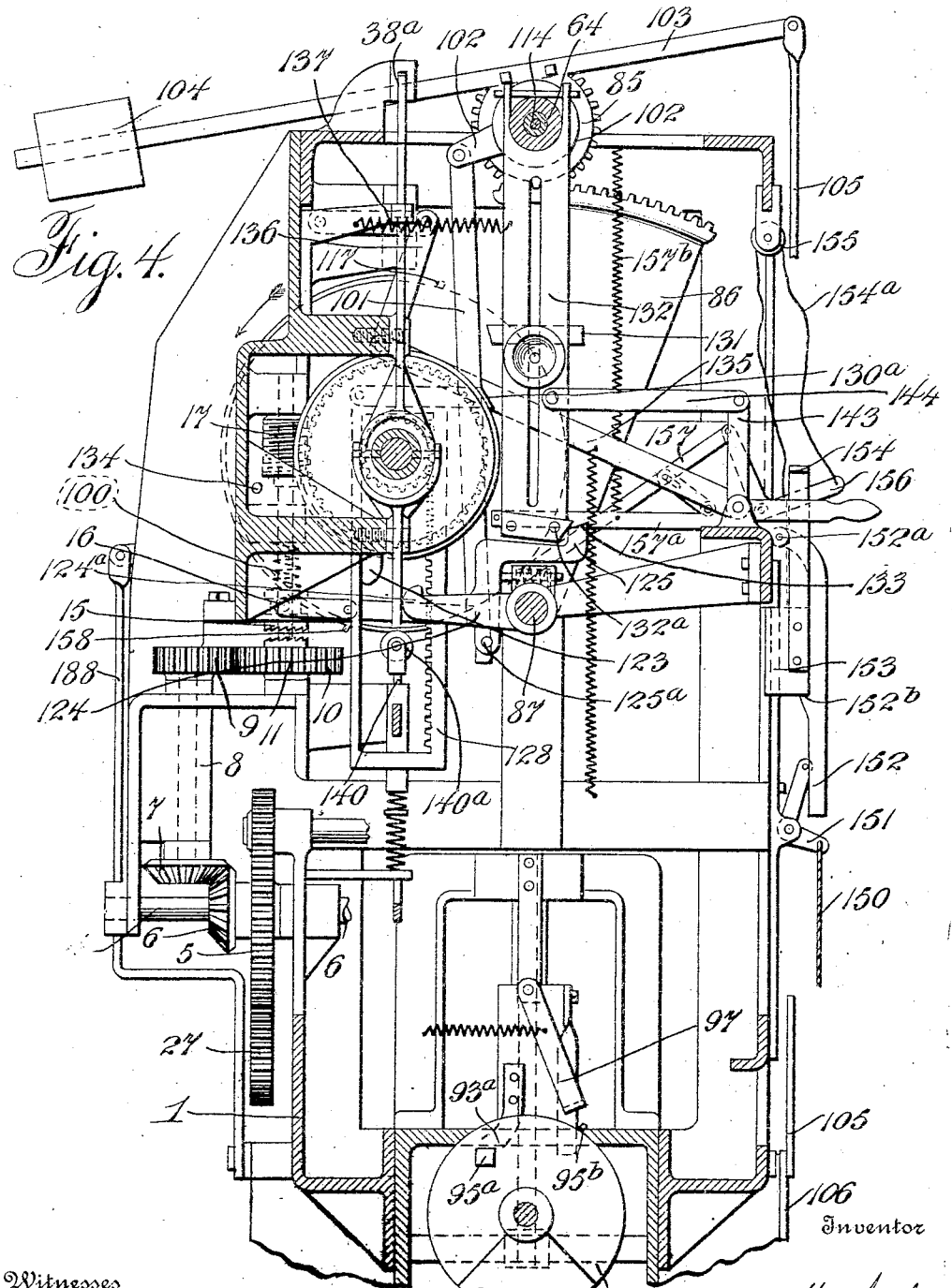

O. A. HANFORD.
GATHER ACTUATED CONTROLLER FOR GLASS BLOWING MACHINES.
APPLICATION FILED JAN. 6, 1911. RENEWED DEC. 30, 1912.
1,123,525.
Patented Jan. 5, 1915.
7 SHEETS—SHEET 5.
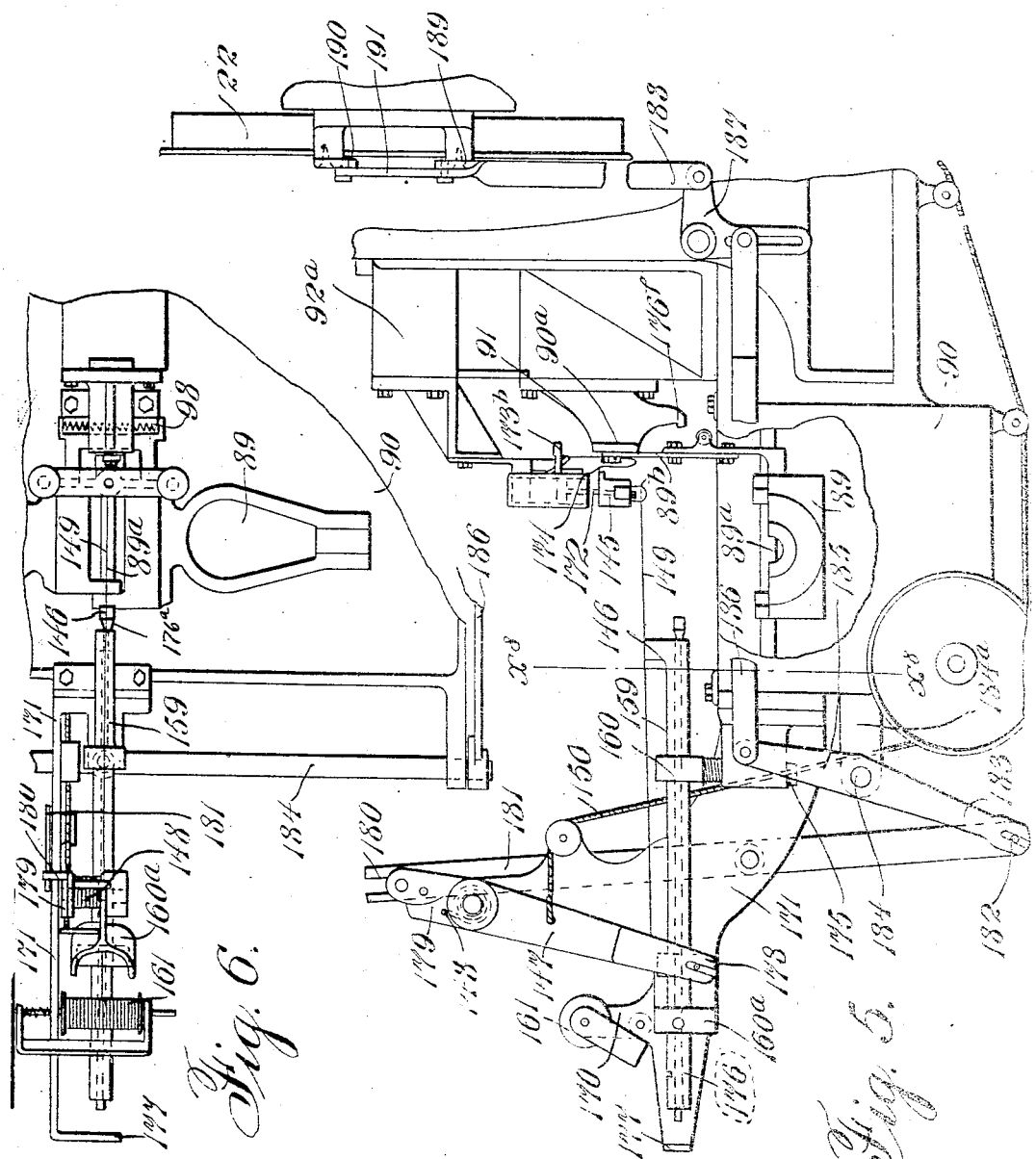

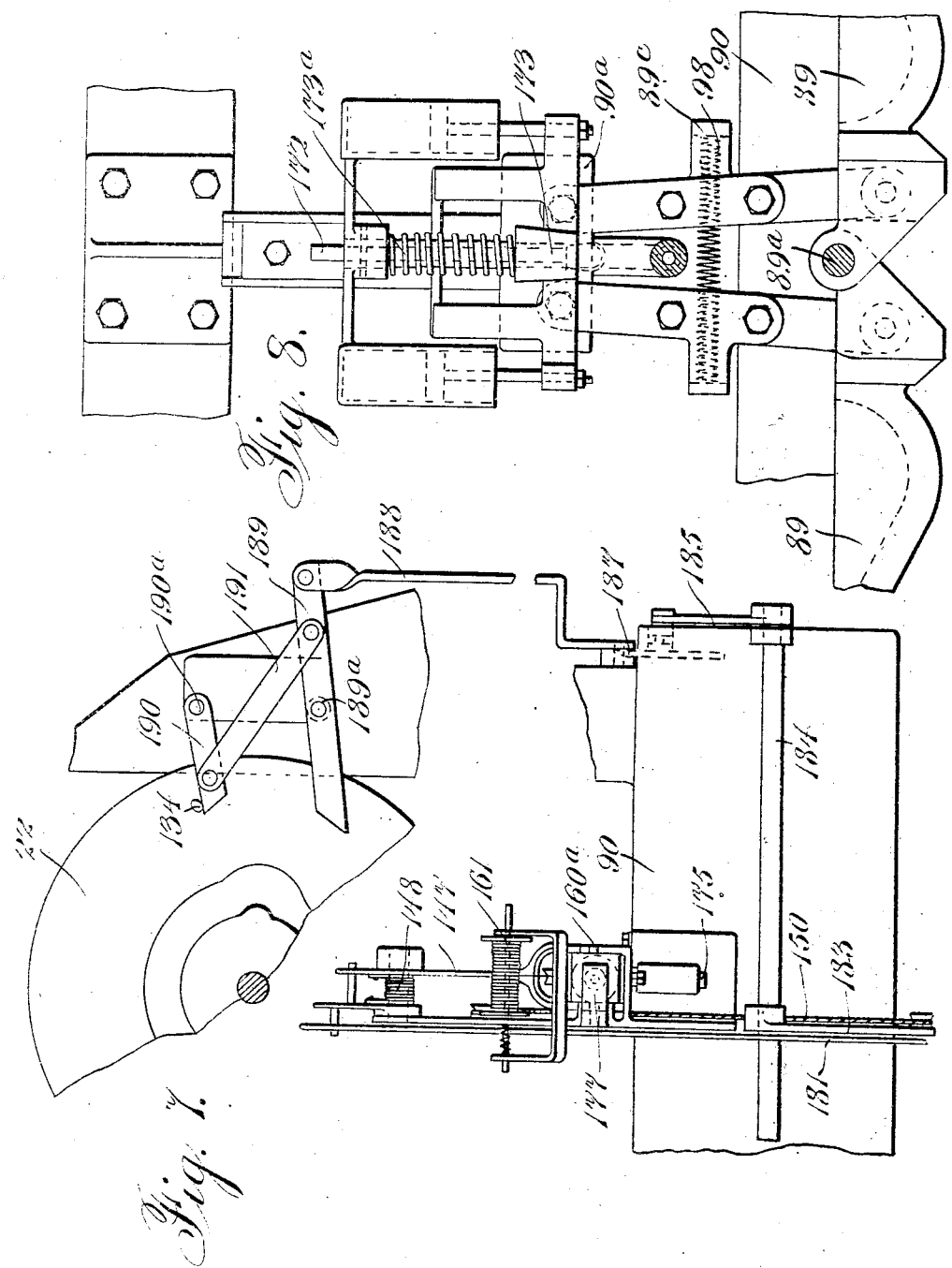

O. A. HANFORD.
GATHER ACTUATED CONTROLLER FOR GLASS BLOWING MACHINES.
APPLICATION FILED JAN. 6, 1911. RENEWED DEC. 30, 1912.
1,123,525.
Patented Jan. 5, 1915.
7 SHEETS—SHEET 7.
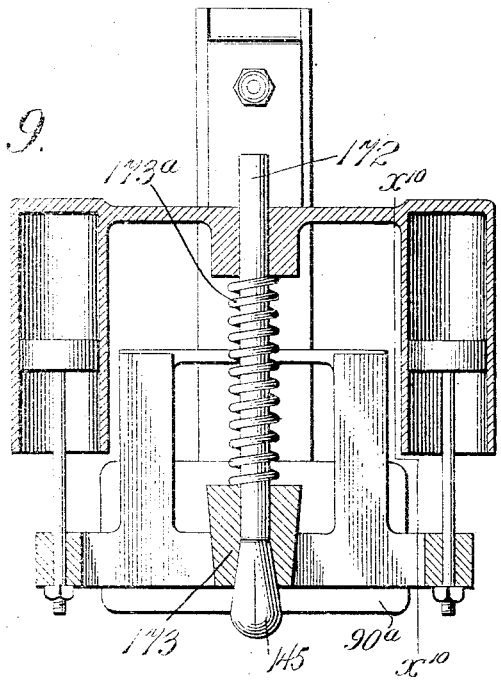
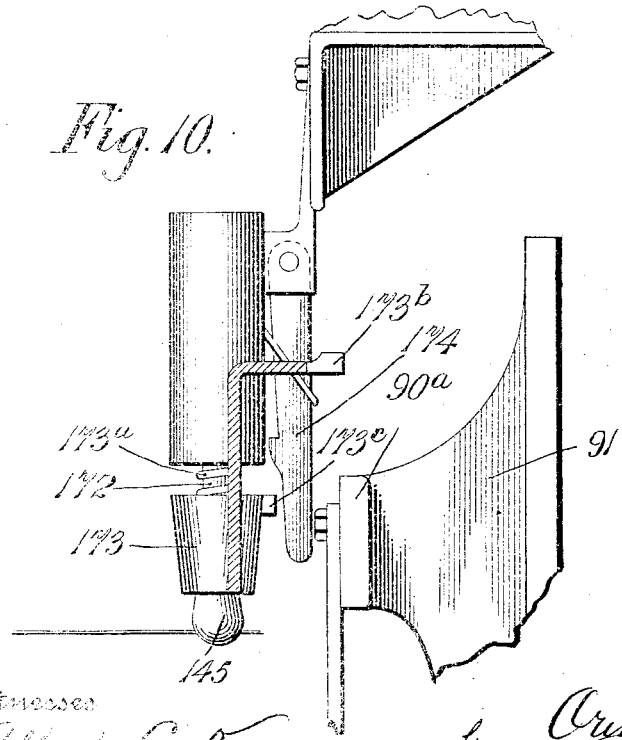

UNITED STATES PATENT OFFICE.

ORIN A. HANFORD, OF ROCHESTER, NEW YORK, ASSIGNOR TO EMPIRE MACHINE COMPANY, OF PORTLAND, MAINE, A CORPORATION OF MAINE.

GATHER-ACTUATED CONTROLLER FOR GLASS-BLOWING MACHINES.

1,123,525.  Specification of Letters Patent.  Patented Jan. 5, 1915.

Original application filed October 27, 1909, Serial No. 524,994. Divided and this application filed January 6, 1911, Serial No. 601,234. Renewed December 30, 1912. Serial No. 739,377.

*To all whom it may concern:*

Be it known that I, ORIN A. HANFORD, a citizen of the United States of America, and a resident of Rochester, New York, have invented certain new and useful Improvements in Gather-Actuated Controllers for Glass-Blowing Machines, of which the following is a specification.

In an original application, Sr. No. 524,994, filed Oct. 27, 1909 of which this is a division I have shown, described and claimed a glass-blowing machine in which, after a blow-pipe with a gather of glass thereon has been placed in a suitable blow-pipe frame forming a part of the machine, and the action of the machine started, the blow-pipe will be swung by power on a horizontal axis and be positioned vertically over the separable mold and arrested in that position to permit elongation and molding, and wherein, after a proper interval, to permit the elongation, the mold will be closed by the power. In the type of the machine specifically claimed in that application, the application of the power to the mold closing mechanism is controlled by a timing element in the machine, which while automatic in its action is based upon the similar behavior of the successive gathers, whereas the period of elongation required for each gather varies with the condition of such gather, as to mass, temperature, etc. It is obvious that these may differ considerably in the several gathers under certain circumstances and I have therefore invented an automatic controller for the blowing and molding, dependent not upon the pre-supposed condition of the gather but upon the action of the particular gather being handled at the time, the controller being actuated by the heat thereof after it has properly elongated. This I believe to be broadly novel with me. I will in this application point out one way in which it may be applied to the machine herein described.

The particular form of automatic control shown herein comprises a thread preferably combustible with suitable means for positioning it in the path of the descending gather, the construction being such that when the integrity of the thread is destroyed by the descending gather the power will be applied to close the molds.

With the mechanism above described is associated devices which are automatic in their action for replacing a fresh thread or length thereof in operative position in respect to the gather on the following blow-pipe for restoring the parts to proper operative relation.

For these purposes my invention also consists in the construction, arrangement and combination of the parts of which it is composed as will be hereinafter described and claimed.

Figure 2:
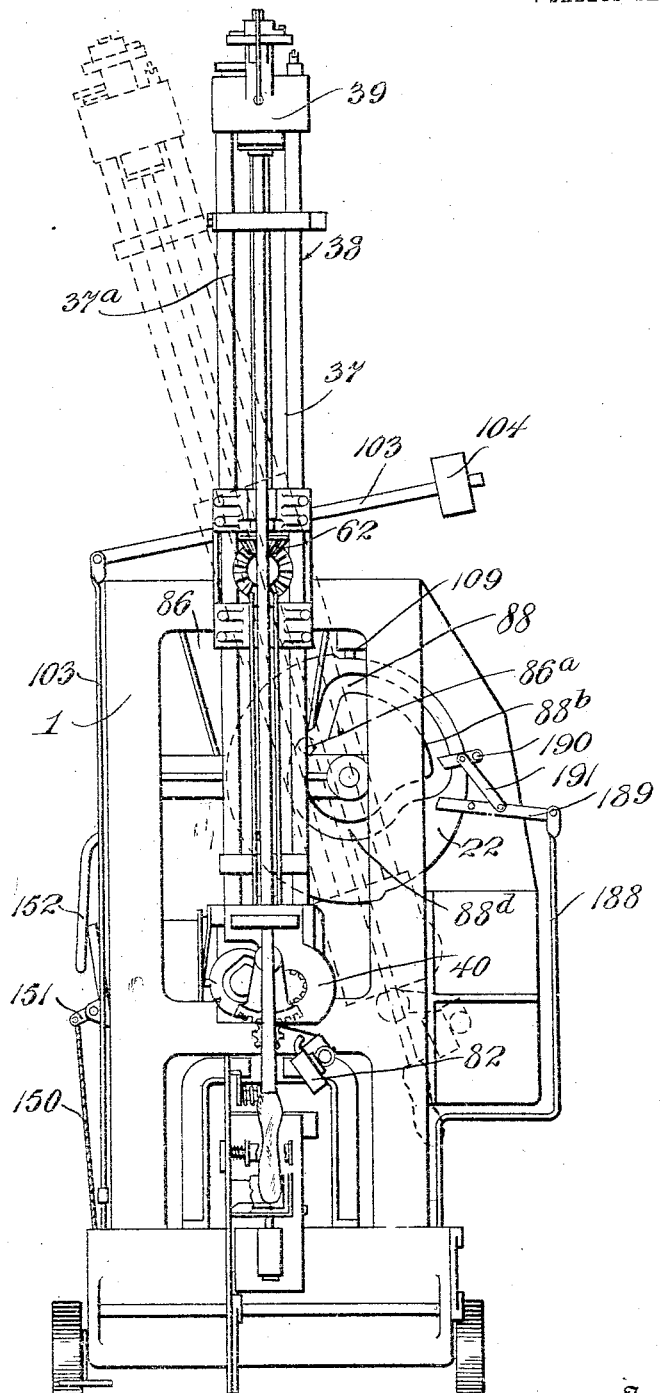
Figure 3:
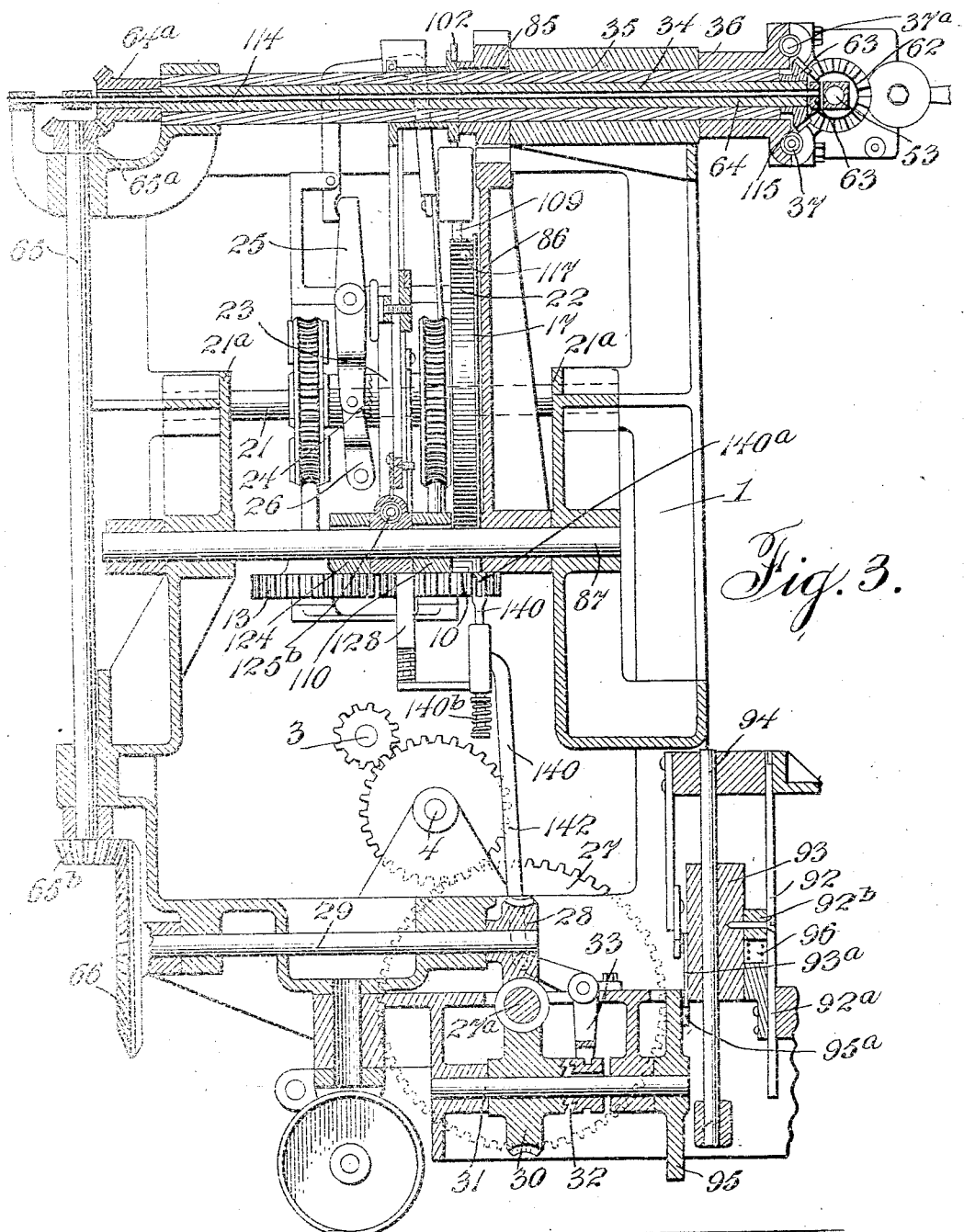

Referring to the accompanying drawings in which corresponding parts are designated by corresponding marks of reference:—Figure 1 is a side elevation of a glass-blowing machine having my invention applied thereto. Fig. 2 is a front view thereof with the blow-pipe in its vertical position. Fig. 3 is a longitudinal section through the machine shown in the above figures. Fig. 4 is a transverse section on line $x^4$—$x^4$ of Fig. 1. Fig. 5 is a detailed side elevation showing my invention. Fig. 6 is a plan view thereof. Fig. 7 is a fragmental front elevation of the parts shown in Figs. 5 and 6. Fig. 8 is a transverse vertical section taken on lines $x^8$—$x^8$ of Fig. 5. Fig. 9 is a transverse vertical section through the fixed clip and Fig. 10 is a longitudinal section on lines $x^{10}$—$x^{10}$ thereof.

The blowing machine is of the character fully described in my original application above named, comprising a frame 1, in the top of which is mounted a blow-pipe frame 37, to move in a vertical plane across the front of the machine, the normal position of the frame being substantially horizontal. A motor 2 is mounted in the frame and through suitable clutch 15 is adapted to drive a cam disk 22, having a cam run 88 by which the blow-pipe frame is moved from its normal position to a vertical position (being "swung" during this moment) and returned to its normal position, the arrangement of the cam run being such that the disk is capable of rotation through a limited arc without moving the blow-pipe frame from its vertical position. The clutch 15 is pressed to close by a spring 100 and in the action of the machine when the blow-pipe has been positioned vertically is opened by mechanism not necessary to be described here and is held open by a latch 125 engaging the end of the yoke lever 16 by which the clutch is opened, this latch being pivoted at 125ª and being provided with a tail 133 adapted to be struck by the lower end of a swinging pendant 132 to which is pivoted a link 144, connected to the vertical arm 143 of a bell crank, the horizontal arm of which projects through from the side of the machine in the form of a handle by which the pendant may be swung manually to release the latch and thus manually reengage the clutch.

The separable mold parts 89 are mounted on the horizontal pivot pin 89ª in the mold tank 90 at the front base of the machine frame, and are connected to the head 90ª of a bracket 91 by links 89ᵇ, the bracket being mounted on a cross head 93, sliding on the vertical guide bar 94 and which is adapted to be lifted by a wheel 95 mounted in the base of the machine and driven from the motor by a clutch 32, the yoke lever 33 of which is shifted to close the clutch by a rod 140 which is actuated by the disk 22 when the latter resumes its movement after it has positioned the blow-pipe vertically and has come to rest.

To effect the closing of the mold by the disk the cross head 93 has a plate 93ª on the rear face thereof which is engaged by a lug 95ª on the wheel 95. The clutch 32 is closed long enough to cause a complete rotation of the wheel 95 but after the lifting of the cross head the latter is caught by a spring latch 97, which holds it in its raised position for the period necessary to complete the molding, after which the latch is struck by a peripheral projection 95ᵇ on the wheel and releases the cross head, after which the mold and connecting parts are restored to normal position by gravity.

An air head 39, is located on the upper end of the blow-pipe frame, and is provided with a suitable air valve mechanism which is actuated upon initial movement of the disk 22, after the latter has positioned the blow-pipe vertically, to admit air to the blow-pipe and to cut it off therefrom a predetermined time thereafter.

The machine thus indicated differs in no way from that described in my said original application to which I make reference for a further showing thereof. Its operation briefly stated is, that upon the introduction of the blow-pipe into the blow-pipe frame the main clutch 15 will be closed and the disk 22 put in rotation to swing the blow-pipe frame and to finally position it with the blow-pipe properly alined over the axis of the mold when the latter is closed. The clutch 15 is now automatically disengaged and the rotation of the disk 22 stops whereby the blow-pipe is held in proper position for elongation.

To provide automatic means for closing the molds after the gather has sufficiently elongated is the object of this invention and this I accomplish as follows:—Above the cooling tank and above the molds, I place clips 145 and 146, one of the clips 145 being stationary in so far as concerns the controlling action of the device while the opposite clip 146 is connected to a pivoted arm 147 which is pressed by a spring 148 in such a manner as to tend to move the clip 146 away from the clip 145. The two clips are connected by a thread or filament 149 of a material which will become severed when brought against or in proximity to the heated gather, such thread or filament while intact, preventing the separation of the clips. The movable clip is further connected by the cord or chain 150 with the horizontal arm of a bell crank 151 pivoted to the right hand side of the main frame. The vertical arm of this lever lies behind a latch 152 pivoted at 152ª to the machine frame and provided with a shoulder 152ᵇ, adapted to engage and hold a raised weight 153, provided with a bail 154 overlying the horizontal arm of the bell crank 143. Under these circumstances when the clips are properly adjusted in height and are connected by the thread, the gather when sufficiently elongated will destroy the latter, permitting the spring 148 to throw back the movable clip 146 and, by the cord 150, to actuate the bell crank 151, releasing the weight 153, which by its mass, acting through the bell crank 143, engages the main clutch. The reengagement of the main clutch again throws the disk 22 into gear with the motor and the rotation of the disk again starts. This results in the closing of the mold through the disk 95, and its subsequent opening and the admission of air during the proper time into the blow-pipe through the air head. While these operations are taking place the blow-pipe frame is held stationary in its vertical position, due to the shape of the cam rim, but upon the opening of the mold the blow-pipe frame will again be swung on its horizontal pivot on the lower end of the blow-pipe with the finished article therein lifted up away from the mold. When all parts have been restored to their normal position the main clutch 15 is opened by mechanism described at length in my original application.

I have found thread a suitable substance to be used as the filament in that when the gather in its elongation comes into contact therewith it is burnt without destroying the perfection of the finished bulb in any way, it neither abstracting heat from or putting a coat upon the gather, either of which might impair the finish.

It is obvious that the weight 153 merely affords a source of energy between the thread and the clutch to actuate the latter with the consumption of a comparatively small expenditure of power, and that it might under circumstances be possible to throw the link 132 by connecting the cord 150 directly thereto. The construction shown however is to be preferred, and as a means of lifting the weight to store up the necessary energy I suspend it from one end of a chain 154ᵃ which, passing over a pulley 155 mounted in the main frame, has its opposite end connected to a horizontal arm of a bell crank lever 156, pivoted in the frame and having its vertical arm connected to the right hand end of a thrust bar 157, supported in the frame by a link 157ᵃ, the left hand end of the bar being held against the periphery of the wheel 22 by a spring 157ᵇ so that on the rotation of the wheel the peripheral stud 158 will thrust the bar 157 endwise toward the right, depressing the horizontal end of the lever 156 and lifting the weight, which is then caught by the latch 152, the thrust bar releasing itself from the stud due to the continued movement of the latter and falling back to normal position. The stud 158 is so positioned on the wheel that the weight is lifted soon after the initial engagement of the main clutch but also after the threading of the clips 145 and 146.

While the clips might if desired be threaded by hand, I have provided means whereby this may be accomplished automatically and in the operation of the machine which means are as follows:—The movable clip 146 is mounted on the rear end of a hollow rod 159 sliding in bearings 160 and 160ᵃ located in front of and above the cooling tank, the clip being formed by a split lug projecting from the top of the rear end of the rod, forming two ears, between which the thread passes from a spool 161 carried in a bracket 170 on a projection 171 from the tank. The fixed clip consists of a split and coned lower end of a rod 172 around which a collar 173 having a coned central recess, is adapted to slide, the collar being normally pressed downwardly by a spring 173ᵃ, but being provided with a finger 173ᵇ adapted to be lifted by the mold closing bracket 91 and with an ear 173ᶜ adapted, when the collar is lifted, to be caught by a latch 174 pivoted in front of the frame of the machine. The collar is thus lifted by the closing of the mold on one gather, which positions it for the insertion of the thread to control the blowing of the following one.

The front guide 160ᵃ for the sliding rod 159 is hung traversely on pivots from the forward projection 171 on the mold tank, while the rear guide 160 is mounted on the upper end of a spring supported stud 175, so that as the rod is projected rearwardly over the mold tank and above the open molds therein, the ears on the end of the rod will strike and pass the collar forming part of the fixed clip, the front end of the rod being depressed, after which it will be restored to its normal level by the spring supported stud 175, thus inserting the thread carried by the clip 146 between the ears of the fixed clip 145. The final rearward movement of the rod will cause the rear end of a bar 176 contained therein to coact with an anvil 177 on bracket 91 and will cause the lug forming the clip 146 to strike the lower end of the latch 174, throwing the latch rearwardly, releasing the collar 173, which will be thrown down upon the coned surface of the clip 145, closing the latter upon the thread. The impact of the bar on the anvil will also shove the bar within the rod and cause the coned end 176ᵃ upon the rear end of the former to separate the ears of the movable clip 146 so that as the rod 159 is drawn forwardly and separated from the stationary clip, the ears of the movable clip will slip on the thread and will not firmly engage it again until the front end of the rod strikes an anvil 177 on the projection 171, and is thus driven rearwardly again, removing its coned rear end from within the rear end of the rod and permitting the ears of the stationary clip to again close upon and engage the thread.

The rod 159 is reciprocated by a pin and slot connection 178 with the pivoted arm 147 connected by the driving spring 148 with a driving arm 179 pivoted upon the same center as the arm 147 on the projection 171, the adjustment of the parts being such that the movement of the arm 179 to give a forward movement of the rod tends through the spring 148 to give a movement to the rod after the movable clip has engaged the thread and thus both holds the thread taut and places the spring under tension. As the actuating cord 150 is attached to the pivoted arm 147, the burning of the thread permits the spring to jerk the arm forwardly and thus release the weight as before described.

The driving arm 179 is swung upon its pivot to reciprocate the rod 159 for threading by a driving device from the motor. In the drawings this consists of a pin and slot connection 180 to the upper end of a lever 181 pivoted in the projection 171 on the tank, the lower end of the lever having a pin and slot connection 182 with the downwardly projecting crank 183 on the end of a shaft 184 carried in the bearings 184ª on the front of the water tank, the opposite projecting crank 185 on the shaft 184 being connected by a rearwardly extending link 186 with one arm of the bell crank lever 187, the other arm of which is connected by a vertical link 188 with the outer end of a lever 189 pivoted at 189ª on the frame of the machine, the opposite end of such lever being located adjacent to the face of the wheel 22. A setting lever 190 is pivoted at 190ª to the frame of the machine above the pivot of the resetting lever and has its end so located as to be struck by a pin 134 on the disk 22, the setting lever being connected by a link 191 intermediate its end and its pivot with the outer end of the resetting lever 189 so that, on the initial rotation of the disk 22 and before the closing of the molds and swinging of the pipe frame to vertical position, the pin 134 will by striking the inner end of the setting lever 190 depress it to pass by and will through the connection described project the rod 159 rearwardly across the mold tank to engage the thread in the stationary clip. The inner end of the resetting lever will be raised at the same time into the path of the pin and then will be immediately engaged by the pin and be depressed to permit the passage of the pin, this retracting the bar and resetting the setting lever to be struck by the pin.

Inasmuch as this divisional case has, in response to the requirement of the Patent Office, been filed to contain claims on the mold closing mechanism shown herein, failure to make claims herein which omit a recital of the mold closing means is not to be taken as an abandonment thereof, as such claims are reserved for my original application, Serial Number 524,994 before recited.

Having thus described my invention, what I claim and desire to secure by Letters Patent is:—

1. In a glass blowing machine, the combination with a blow-pipe of a separable mold, and means controlled by the heat and elongation of the gather on the blow-pipe for closing the mold thereon, substantially as described.

2. In a glass blowing machine, the combination with a blow-pipe of a separable mold, driving means for closing the mold and a mechanism actuated by the heat and elongation of the gather on the blow-pipe for controlling the application of the driving means to the mold.

3. In a glass blowing machine, the combination with a blow-pipe, of a separable mold, and air supply and means controlled by the heat and elongation of the gather on the blow-pipe for closing the mold on the gather and admitting air into the blow-pipe.

4. In a glass blowing machine, the combination with a separable mold, a movable blow-pipe, a motor, driving means to move the blow-pipe to position the blow-pipe above the mold for elongation of the gather thereon, and means controlled by the elongation of the gather to cause the motor to close the mold upon the gather.

5. In a glass blowing machine, the combination with a separable mold, a movable blow-pipe support, driving mechanism, means actuated by the driving mechanism in a predetermined order and speed to move the blow-pipe support for positioning a gather on the blow-pipe thereon for elongating and molding, and means controlled by the elongation of the gather to close the mold upon the gather, and means actuated by the driving means to restore the parts to normal position at a predetermined time thereafter.

6. In an automatic mold closing mechanism for glass blowing machines, the combination with a mold, and mechanism for closing the same, of means for bringing the closing mechanism into action, consisting of a combustible filament which is severed by the descending gather.

7. In an automatic mold closing mechanism for glass blowing machines, the combination with a mold, and mechanism for closing the same, of a combustible filament located in the path of the gather and adapted on the destruction thereof to connect the mold closing means with the mold, and means for positioning a new filament as described.

8. In an automatic mold closing mechanism for glass blowing machines, the combination with a mold and mechanism for closing the same, of a movable thread holder for positioning a thread in proximity to the path of the descending gather and held in position by a thread therein, means controlled by the position of the thread holder for bringing the mold closing means into action to close the mold and means for inserting a new thread in the thread holder.

9. In an automatic mold-closing mechanism for glass blowing machines, the combination with a mold, and mechanism for closing the same, of a combustible element located in the path of the descending gather and serving upon the descent of the gather to bring the mold-closing mechanism into action.

10. In an automatic mold-closing mechanism for glass-blowing machines, the combination with a mold, of mechanism for closing the same, a motor, means driven thereby for positioning a combustible element in the path of descent of a heated gather, and means controlled by the combustible element for connecting the mold-closing mechanism with the motor, and for causing the motor to again position another portion of the combustible element in the path of the descending gather.

In testimony whereof I have hereunto affixed my name in the presence of two witnesses.

ORIN A. HANFORD.

In the presence of—
 DONALD SHOECRAFT,
 SARAH W. NEUMAN.